May 28, 1935.  C. JORIOT  2,002,948
DEVICE FOR PLACING PROTECTIVE COVERINGS AUTOMATICALLY
ON THE SEATS OF WATER CLOSETS
Filed April 5, 1934  7 Sheets-Sheet 1

C. Joriot
INVENTOR

By Marks & Clerk
Attys.

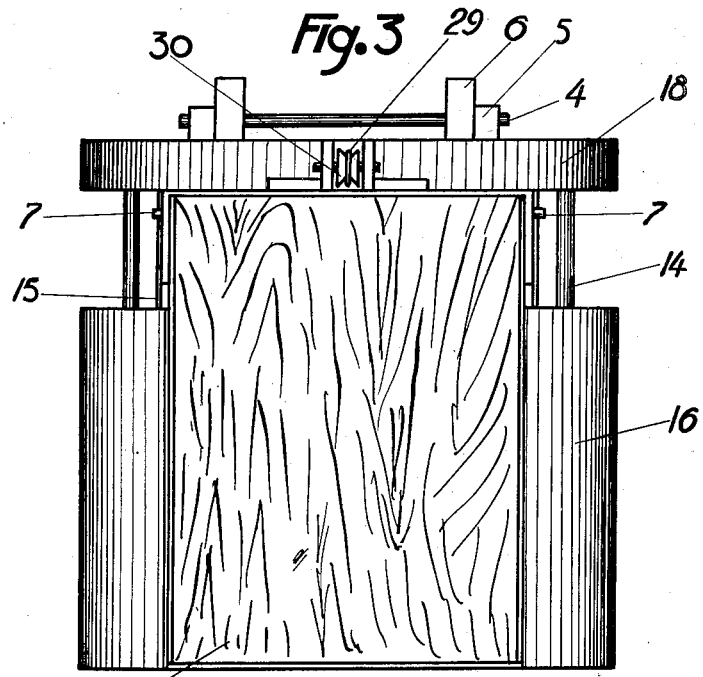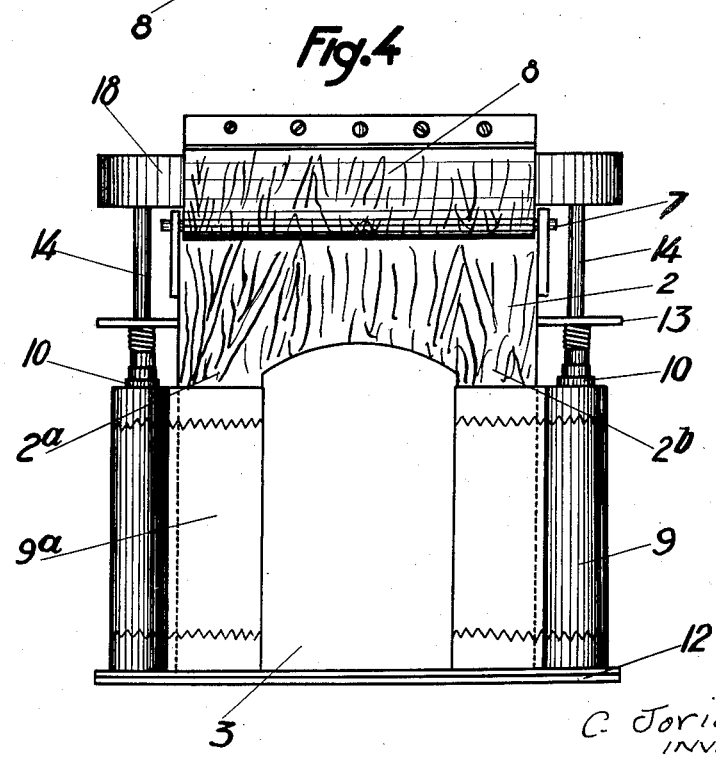

May 28, 1935. C. JORIOT 2,002,948
DEVICE FOR PLACING PROTECTIVE COVERINGS AUTOMATICALLY
ON THE SEATS OF WATER CLOSETS
Filed April 5, 1934 7 Sheets-Sheet 3

C. Joriot
INVENTOR

By: Marks & Clerk
ATTYS.

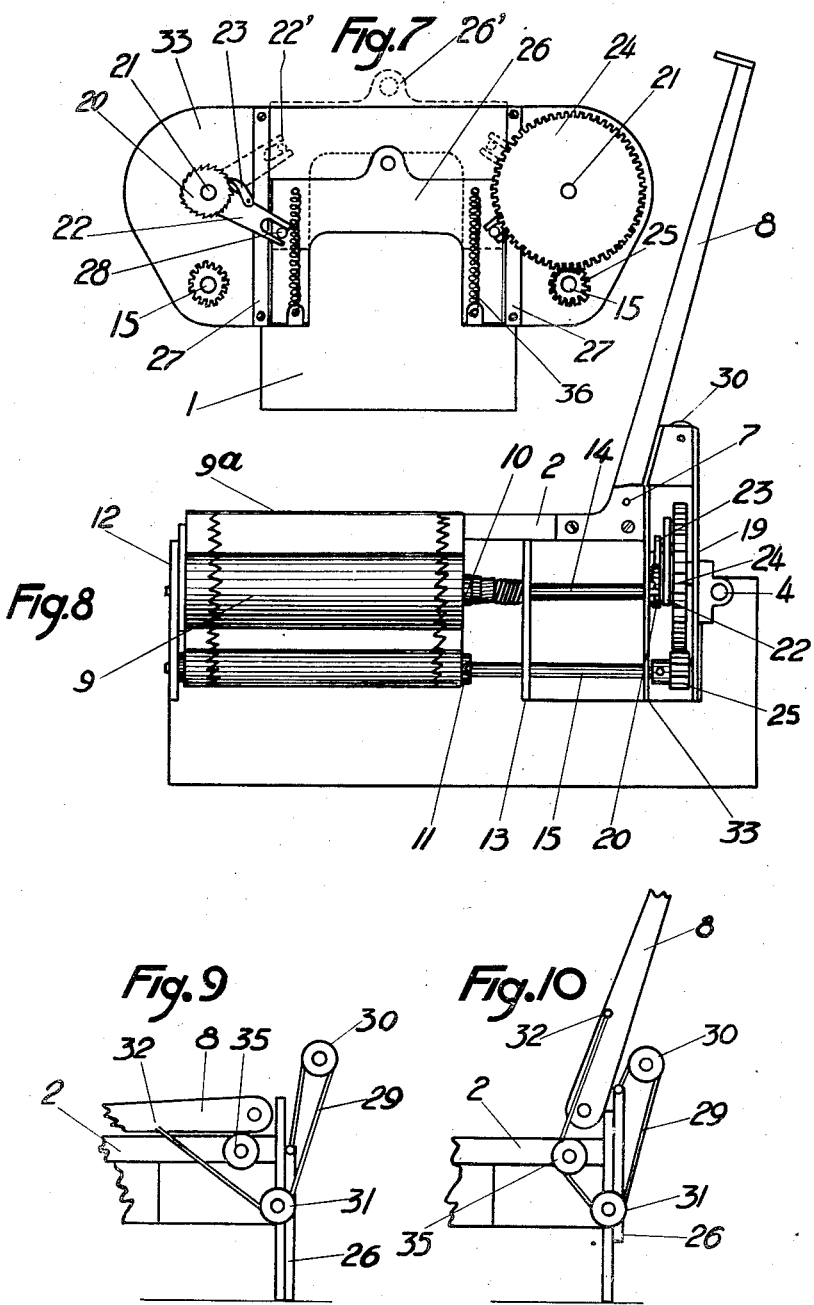

May 28, 1935.  C. JORIOT  2,002,948
DEVICE FOR PLACING PROTECTIVE COVERINGS AUTOMATICALLY
ON THE SEATS OF WATER CLOSETS
Filed April 5, 1934   7 Sheets-Sheet 5
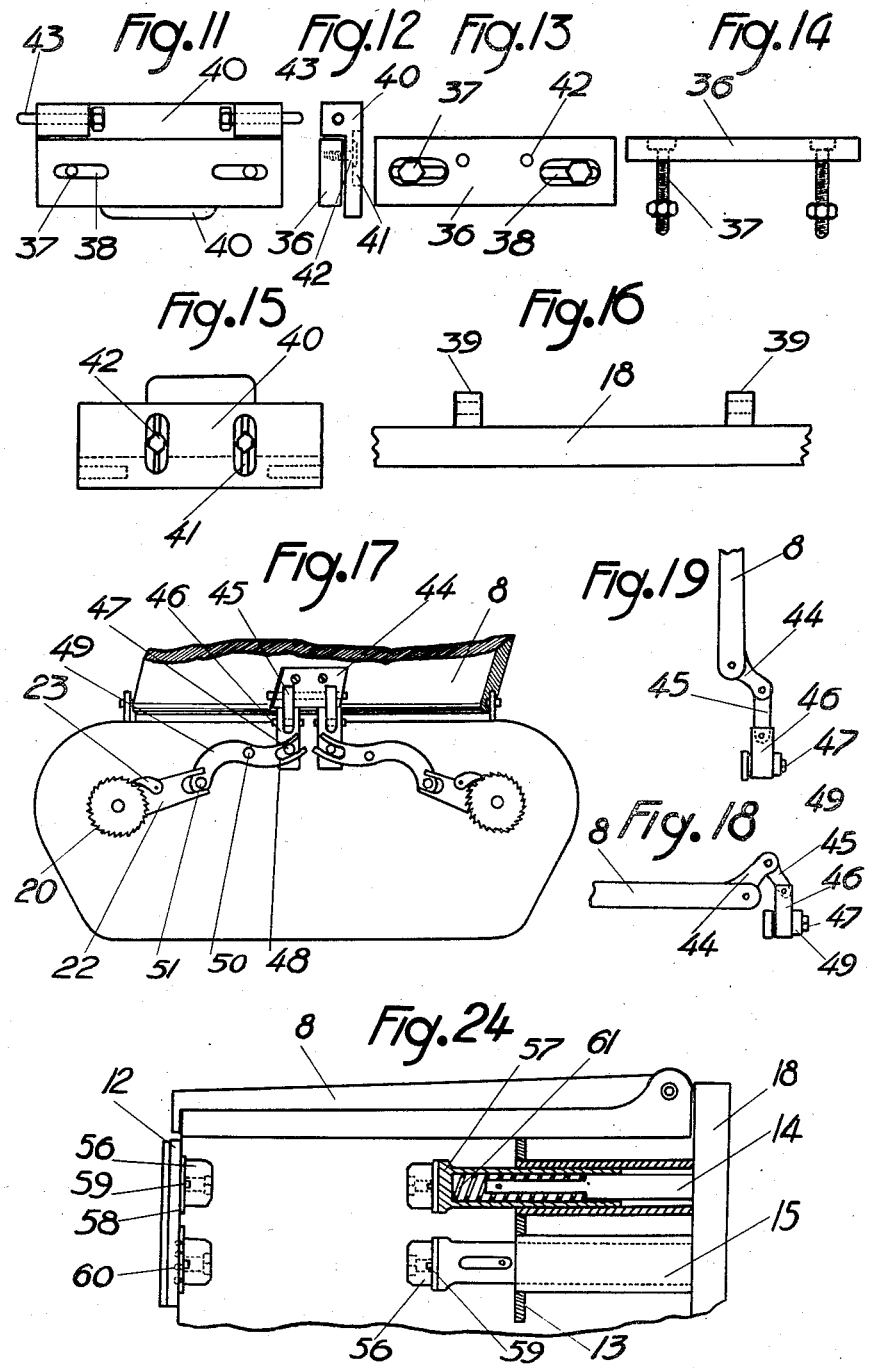

May 28, 1935.     C. JORIOT     2,002,948
DEVICE FOR PLACING PROTECTIVE COVERINGS AUTOMATICALLY
ON THE SEATS OF WATER CLOSETS
Filed April 5, 1934     7 Sheets-Sheet 6
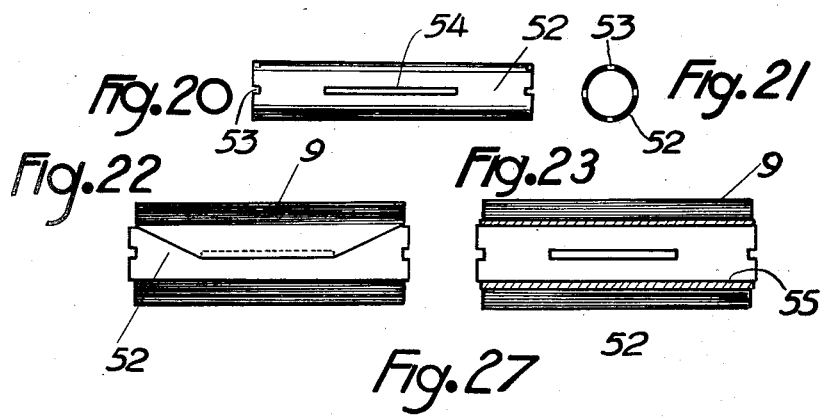
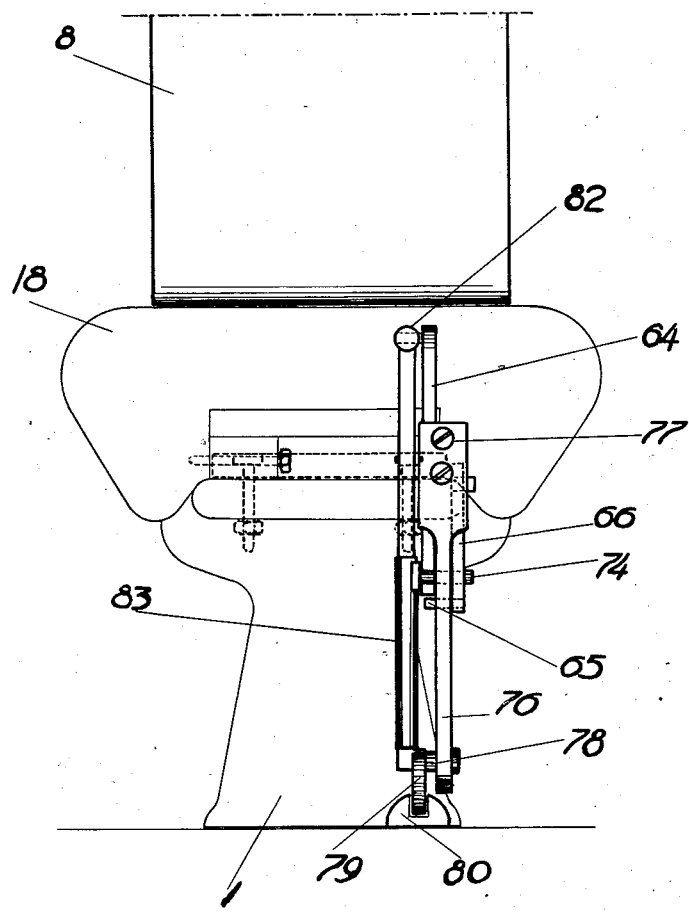
C. Joriot
INVENTOR
By: Marks & Clark
Attys.

May 28, 1935.  C. JORIOT  2,002,948
DEVICE FOR PLACING PROTECTIVE COVERINGS AUTOMATICALLY
ON THE SEATS OF WATER CLOSETS
Filed April 5, 1934    7 Sheets-Sheet 7
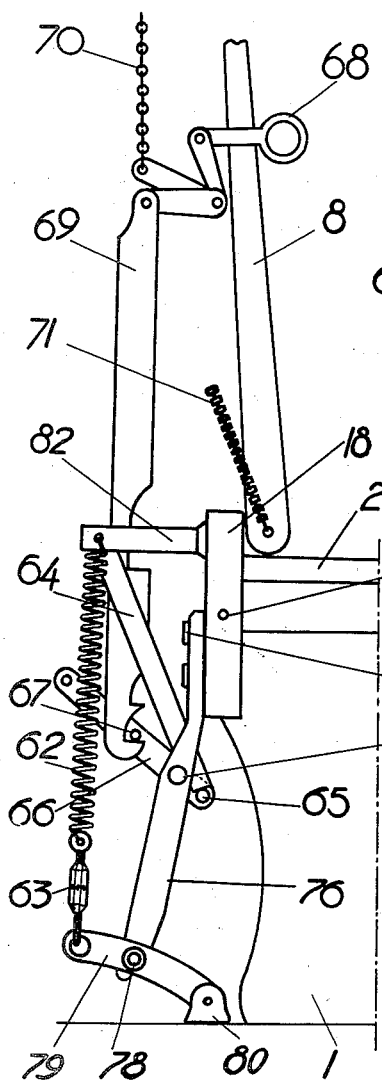
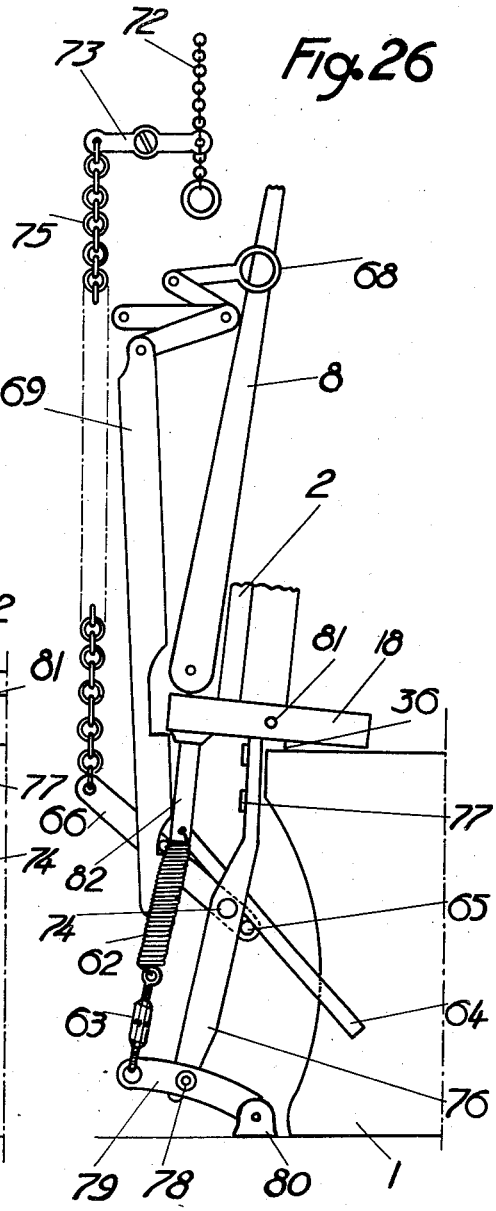
C. Joriot
INVENTOR
By Marks & Clark
ATYS.

Patented May 28, 1935

2,002,948

UNITED STATES PATENT OFFICE 2,002,948

DEVICE FOR PLACING PROTECTIVE COVERINGS AUTOMATICALLY ON THE SEATS OF WATER CLOSETS

Camille Joriot, Lac-ou-Villers, France

Application April 5, 1934, Serial No. 719,218
In France April 13, 1933

6 Claims. (Cl. 4—247)

The invention relates to lavatories with seats and has for its aim to provide all desirable comfort to persons using the same, from the point of view of cleanliness and hygiene, protecting them entirely from the risks incurred in known installations of contracting very serious infectious diseases, particularly in hotels, trains, public lavatories and the like. Further, the present invention has the very important advantage of not requiring the user to perform any complicated manipulation and particularly the handling of objects which have previously been soiled by others. This constitutes an important progress in public health without causing any inconvenience to those who benefit thereby.

For this purpose the invention includes means which are combined with the seat of the water closet pan and arranged and designed in such a way as to ensure automatically before, or after, each use of the sanitary apparatus, the placing into position of a protective seat covering, which may for example be of paper, and the removal of the seat covering which has been used.

According to one form of application of the invention the device includes, for each side of the seat, a seat covering band of paper delivered from a supply roller and which is wound up on a rewind roller after having passed over the seat, the movement of the rewind rollers being effected by means of a suitable mechanism.

The invention also relates to means for the removal of the device and its easy and rapid fitting on all kinds of pans; to means for actuating the rewind rollers for the seat covering bands, and the arrangement of spools and spool supports for the said bands, as well as means for raising the seat automatically.

Several forms of application of the present invention are described hereinafter and are shown schematically, by way of an example, in the attached drawings, in which:

Fig. 3 is a plan view from above corresponding to Fig. 1.

Fig. 4 is a plan view from above, the lid of the seat being raised and the casings in which the supply rollers and rewind rollers of the seat covering sheets are housed, being removed.

Fig. 7 is a view similar to Fig. 6 but with the casing of the mechanism removed.

Fig. 8 is a side elevation with the lid raised and the casings opened laterally.

Figs. 9 and 10 are schematic detail views in side elevation, showing the working of a part of the mechanism in two extreme positions, the lid being lowered in Fig. 9 and raised in Fig. 10.

Figs. 11 to 16 show auxiliary mounting means, by which it is possible to remove the apparatus and to fit it easily and rapidly onto all types of pans.

Fig. 11 is a front view of these means assembled.

Fig. 12 is a side view.

Figs. 13 and 14 are front and side views respectively showing one of the plates permitting adjustment.

Fig. 15 is a front view of the other plate; and

Fig. 16 is an elevation of the rear casing of the protective device.

Figs. 17 to 19 relate to an alternative mechanism for driving the rewind roller:

Fig. 17 is an elevation of the mechanism, and

Figs. 18 and 19 are detail views, the first showing the lid in a lowered position whilst in the second the lid is in a raised position.

Figs. 20 to 24 relate to the spools for the seat covering bands:

Fig. 20 is an elevation of a tubular spool support in an empty state;

Fig. 21 is a side view;

Figs. 22 and 23 show two different kinds of the supply rollers;

Fig. 24 is an elevation, partly in section, of the arrangement for mounting the tubes for the supply rollers and rewind rollers.

Figs. 25 and 26 are views showing the mechanisms for the automatic raising of the seat.

Fig. 27 is a general view seen from the rear of the pan.

Figure 1:
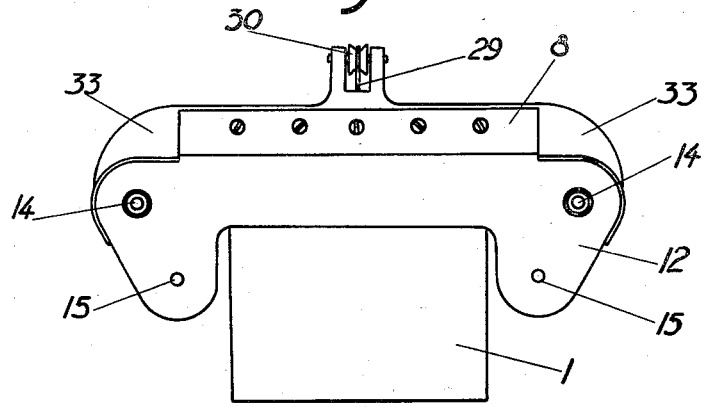
Fig. 1 is a front elevation as seen by a person facing the front of a water closet pan provided with a seat and a lid combined with a device according to the invention, the lid being shown in a lowered position.
Figure 2:
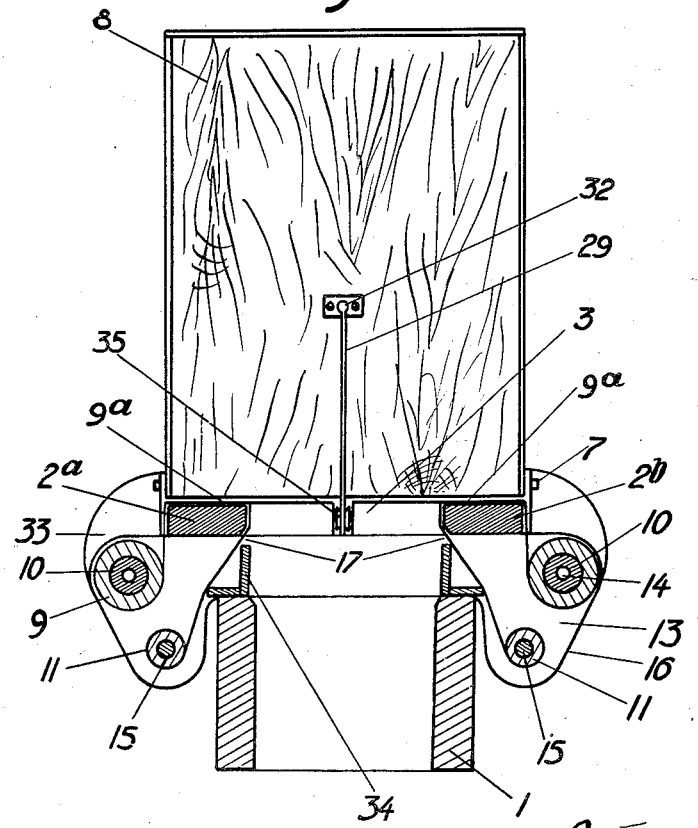
Fig. 2 is an elevation and vertical section, the lid being raised.
Figure 5:
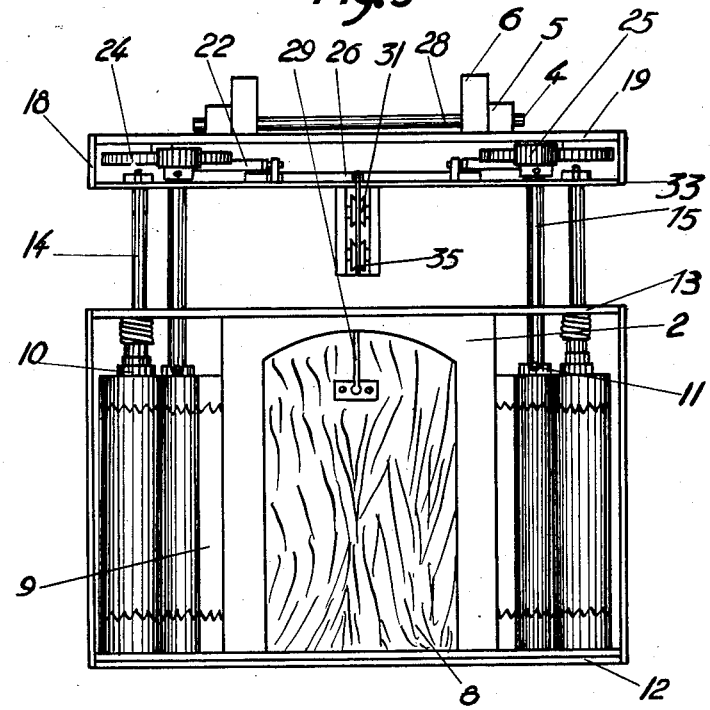
Fig. 5 is a plan view from above showing the supply and rewind rollers of the seat covering bands as well as the actuating mechanism.
Figure 6:
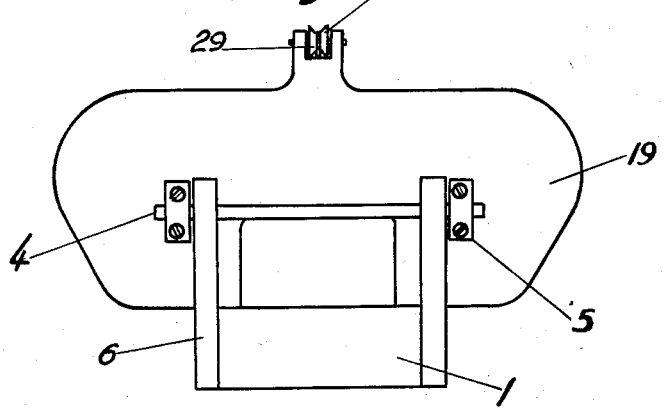
Fig. 6 is a front elevation seen from the rear.

In these figures 1 is the pan and 2 is the seat that can be lowered, said seat being shaped according to an opening 3 and pivoting, by the lugs 5, about an axle 4 mounted in fixed supports 6.

A solid lid 8 is arranged on the seat 2 so that it can pivot on pins 7.

According to the invention, the seat and the lid are provided with means which are so designed and arranged that, each time that the lid 8 is raised so that the sanitary apparatus can be used, this necessary operation results in the automatic placing into position of fresh protective bands 9a made of paper for example, on the sides 2a and 2b respectively of the seat 2, along the edges of the opening 3, and at the same time causes the protective bands, which previously have been used, to disappear.

For this purpose in the form of construction shown in the drawings, there is provided, for each of the sides 2a and 2b respectively, a supply roller 10 carrying a roll of paper 9 from which the paper unrolls and passes over the corresponding side of the seat on which it forms a protective seat covering band 9a, which later on will wind itself up on the rewind roller 11 provided for the paper which has been used.

The two supply rollers 10 are so mounted that they can be removed for replacing the rolls between the support plates 12 and 13 which are fixed on the seat 2, each of said rolls being supported by a shaft 14 arranged between the plate 12 and another plate 33 which is also fixed on the seat.

The two rewind rollers 11 are also mounted between the plates 12 and 13 in such a way as to allow the used paper to be removed, and each of said rollers is rotated by a shaft 15.

The plates 12 and 13 form the extreme vertical sides of the roll covering case 16 having perpendicularly to the opening 3 of the seat 2, a corresponding opening closed laterally by the plates 34 with a slot 17 through which the paper 9 can pass.

The shafts 15 are actuated by means of a mechanism arranged in a rear case 18, defined at the front by the foundation plate 33 and at the rear by the foundation plate 19. This mechanism includes a ratchet wheel 20 mounted freely on a shaft 21 on which is freely mounted a lever 22 carrying a pawl 23 which engages with the teeth of the ratchet wheel 20 integral with a gear wheel 24 also mounted loosely on the axle 21 and which is in mesh with a gear wheel 25 keyed on to the shaft 15.

By tipping the lid 8 upwards, the two ratchet wheels 23 are automatically actuated and, for this purpose, the device includes, for example, a driving plate 26 which is arranged slidably between the vertical guides 27 and is provided with two actuating pins 28 engaged between the pronged ends of the levers 22 which carry the pawls, the said plate 26 being suspended in its centre from a cable 29 passing over a guide pulley 30 mounted on the upper part of the rear case 18 and then over the lower guide pulleys 31 and 35, the said cable being attached by its other end to 32 on the inner face of the lid 8.

The working of the device is therefore easily understood.

When the user lifts the lid 8 this causes the plate 26 to move upwards to the position 26' and by means of the pins 28 to displace the levers 22, which carry the pawls, to the position 22', thus actuating the ratchet wheels 20, the movement of which is transmitted by the toothed wheels 24 and 25 to the shafts 15 rotating the rollers 11. In this way the latter cause the unwinding of a certain length of clean paper from off the supply rollers 10, whilst the paper which has been used moves away from the sides 2a and 2b and makes room for the clean paper.

When the lid is lowered after the sanitary apparatus has been used, the plate 26 falls by its own weight, assisted, if necessary, by the tension springs 36, the pawl carrying levers 22 returning to the position shown in full lines in Fig. 7 and the pawls 23 pass over the teeth of the ratchet wheels 20.

With regard to the auxiliary means for mounting the protective apparatus (Figs. 11–16), they consist of a plate 36 provided with bolts 37 which can slide in grooves 38, thus making it possible to adjust the distance between the said bolts so that it will correspond to that of the pan to which the protective device is to be fitted. On the plate 36 is superposed another plate 40 which is provided with grooves 41 in which engage the bolts 42 which are screwed into the plate 36. The second plate 40 moreover is provided with gudgeons 43 which act as pivot pins and which cooperate with the lugs 39 of the rear case 18 of the protective device. As a result, owing to the adjustment provided by means of the grooves 41, it is possible to fix the plate 40 at the desired place on to the plate 36 thus ensuring that the protective device will, at the front, come to the edge of the pan, no matter what the length of the pan itself may be.

With regard to the actuating mechanism for the rewind rollers 11 by the movement of the lid 8, the arrangement shown in Figs. 17–19 is simpler than that described above and as shown in Fig. 7. The lid 8 is provided with a support 44 on which are pivoted two rods 45 each of which is pivoted at its other end on a sliding member 46 which is provided with a roller 47 engaged by the forked head 48 of a balanced lever 49 pivoted at 50, the other end of which is provided with a pin 51 engaging with the fork end of the lever 22, the pawl 23 of which moves the ratchet wheel 20 actuating the driving shaft 15.

With regard to the seat covering bands, these are arranged on tubes 52 (Figs. 20–23) made of cardboard or other suitable material and provided with a longitudinal slot 54 into which the end of the paper band which is to be rolled up is inserted. At its ends, the tube 52 is provided with notches 53 into which fit the actuating members which will be explained hereinafter. The use of such tubes in the protective device means a considerable saving and also allows of the very rapid replacing of the rollers in an analogous manner to those in photographic cameras. The rewind rollers being thus formed by the said tubes 52, the supply rollers may consist either of one single piece (Fig. 22), the supply of paper 9 being wound directly on to the tube 52, or of two pieces (Fig. 23) the supply of paper 9 being wound on to an ordinary tube 55 which is then slid on to the tube 52.

With regard to the mounting of the supply and rewind roller tubes (Fig. 24) this is carried out as follows:

The tubes are introduced between the supporting plates 12 and 13 on to the tube carriers 56.

The supply roller, which must rotate freely on the shaft 14, is mounted on the side of the plate 13 by means of a muff 57 sliding on the shaft 14 and under the influence of a spring 61. On the end of this muff are arranged a fibre plate 58 and a carrier 59 on to which is fitted the tube 52 and which turns freely on the fixed shaft 14, the friction against the plate 58 acting as a brake. On the side of the plate 12 there is the same arrangement of carrier 59 and plate 58. As a result of this arrangement, the feed roller is influenced by a braking action, due to, the spring 61, between the fibre plates 58 and this will give the necessary tension to the seat covering band.

As regards the rewind roller, the carrier 59, although arranged slidably, is integral with the driving shaft 15 with which it rotates, and there is no friction plate. On the side of the plate 12 the carrier rests preferably on a thrust ball bearing 60.

It is evident that the actuating of the protective device, instead of originating from the movement of the lid, can be derived from other members and particularly can it be carried out by the movement of the seat, if the latter is pivotally arranged.

It is possible in fact to leave the seat in a raised position normally, so that the pan is open and can be used as a urinal.

In this case several devices can be used in order to ensure the automatic raising of the seat.

In the example shown in Figs. 25 and 26 the movable seat 2 is fixed on the case 18 which is pivotally arranged at 81 and is provided with a right angle extension 82 which is under the influence of a spring 62 arranged in a telescopic tube 83 and provided with the tension adjuster 63, fixed on a lever 79. This lever 79 is pivotally mounted at 78 at the end of a support 76 which is affixed by the bolts 77 or by some other means to the plate 36; the said lever 79 terminating at the end which is remote from the point of attachment of the spring 62 in a pivot head or foot 80 which rests all the more heavily on the ground as the load of the spring 62 increases. This arrangement ensures a greater rigidity of the support 76 and besides renders it unnecessary to make a hole in the floor for the purpose of fixing the said support.

When the user lowers the seat 2, an arm 64, which is pivoted on the extension 82 of the case 18 will be supported on the head 65 of a lever 66 pivoted at 74 on the support 76.

It is therefore easily to be understood that, when the lever 66 is so displaced that it allows the end of the arm 64 to escape from the head 65, the seat 2 will rise automatically under the action of the spring 62.

This displacement of the lever 66 can be effected in various ways. For instance, it is possible to attach to the end which is remote to the head 65, a chain 75 connected to a two armed lever 73 to which is attached the chain 72 of the water flush, so that the seat will rise automatically when the chain 72 is pulled (Fig. 25).

Also it is possible to provide an actuating bar 69 which, when the seat is lowered, engages with a pin 67 on the lever 66, the said bar being displaced by the operation of a handle 68. By pulling on this handle 68 the disengagement of the seat 2 is effected.

Further it is possible to provide an arrangement which ensures this release automatically in the event of the user having neglected to carry out any operations. For this purpose a chain 70 is connected at the one end to a rearwardly extending lever attached to the handle 68 and at the other end to the door of the premises. As an accessory it is possible to fix a chain 71, for example, to the pivoting point 7 of the lid 3 and to the lever of the water flush so as to ensure the discharge of the flush automatically when the apparatus rises again.

It is clear that other variations and improvements of details can be conceived without going outside the limits of the invention.

In particular the protective sheets 9a, instead of being unwound from off the roller 10 and being wound on to the rewind roller 11, could be unwound from a reserve roller by a traction device consisting of a combination of rollers of different diameters, as in typewriting machines, the paper being pulled over the sides 2a and 2b of the seat, the used part being cut off automatically so that it will fall into the pan.

Also it is possible to use, for the purpose of forming the protective seat coverings a single roll of paper, said paper comprising a series of seat coverings having the shape of the seat, being cut out like the latter, and being connected with one another by bands of paper a few centimetres long and wide. A reciprocating device, arranged at the rear, provided with clips and actuated by the chain of the water flush or by some other means, first removes the seat covering which has been used and allows it to fall into the pan, after which it places in position a fresh seat covering and cuts the strips which connect it with the remainder on the supply roller.

I claim:—

1. In a device for placing protective coverings on the seats of water closets, rollers mounted on each outer side of the seat, a sliding plate, means connecting the sliding plate with the lid of the bowl to cause said sliding plate to move with the bowl and engaging means for actuating said rollers on the movement of the lid.

2. In a device for placing protective coverings on the seats of water closets, rollers mounted on each outer side of the seat, a support affixed to the lower part of the lid, mechanism operatively connecting said lid with said rollers to rotate said rollers on upward movement of the lid.

3. A device as claimed in claim 1, and an adjustable fitting device comprising a plate and means for affixing said plate adjustably to the bowl, a second plate adjustably connected to said first plate and means on said second plate for pivotally mounting the device thereon.

4. In a toilet device having means providing renewed protecting coverings for the seat, a casing containing the mechanism for operating said protecting coverings, a seat attached thereto and a projection on the opposite side of said casing, a support for said casing and a pivotal attachment of said casing to said support, means attached to said projection on the casing holding the seat in elevated position, an arm pivoted on said projection, a lever pivoted on said support and having an extension in the path of said arm when the seat is down whereby the seat may be held down against the pull of the means for raising the same and means for moving said lever out of the path of said arm whereby the seat raising means are brought into action.

5. The device as claimed in claim 4 wherein the means for holding the seat comprises a spring attached to said projection, a base and a second lever pivoted to said base, said support being pivoted to said second lever and said spring attached to said lever at one extremity.

6. The device as claimed in claim 4 wherein the means for holding the seat comprises a spring attached to said projection, a base and a second lever pivoted to said base, said support being pivoted to said second lever and said spring attached to said lever at one extremity, and the means for moving the first named lever out of the path of the arm is connected to the flushing apparatus.

CAMILLE JORIOT.